United States Patent [19]
Rivenbark

[11] Patent Number: 6,003,748
[45] Date of Patent: Dec. 21, 1999

[54] FISHING ROD HOLDER FOR CARTOP CARRIERS

[76] Inventor: Carl Rivenbark, 9950 S. Ocean Dr., Jensen Beach, Fla. 34957

[21] Appl. No.: 09/184,944

[22] Filed: Nov. 3, 1998

[51] Int. Cl.[6] .................................. B60R 9/08; B60R 9/00
[52] U.S. Cl. ......................... 224/319; 224/324; 224/922; 211/70.8; 43/21.2
[58] Field of Search .................................. 224/309, 319, 224/324, 922; 211/70.8; 43/21.2

[56] References Cited

U.S. PATENT DOCUMENTS

| | | | |
|---|---|---|---|
| 2,173,953 | 9/1939 | Schwisow | 211/70.8 |
| 2,554,650 | 5/1951 | Waite | 224/922 X |
| 2,721,680 | 10/1955 | Steckman | 224/922 X |
| 2,807,398 | 9/1957 | Mathews | 224/922 X |
| 2,907,506 | 10/1959 | Sammons | 224/922 X |
| 3,524,572 | 8/1970 | Hall | 224/922 X |
| 3,848,785 | 11/1974 | Bott | 224/319 |
| 4,782,624 | 11/1988 | Head | 43/21.2 |
| 4,871,099 | 10/1989 | Bogar, Jr. | 224/922 X |
| 4,961,505 | 10/1990 | Moeller | 211/70.8 |
| 5,094,351 | 3/1992 | Barney | 224/922 X |
| 5,613,318 | 3/1997 | Hislop | 43/21.2 X |
| 5,803,519 | 9/1998 | Daigle | 211/70.8 X |

*Primary Examiner*—Gregory M. Vidovich
*Attorney, Agent, or Firm*—Rodger H. Flagg

[57] ABSTRACT

A fishing rod holder assembly for transporting at least one fishing rod upon an existing luggage carrier having at least two cross bars. The fishing rod holder assembly comprises a tubular housing member having a reel slot at one end, with a handle slot disposed in alignment with the reel slot on the opposing side of the tubular housing, and a clamping bar for releasably and adjustably securing the tubular housing member to a selected cross bar of the existing luggage carrier. A resilient support member has a vertical slot positioned in axial alignment with the tubular housing member. The resilient support member has a mounting bracket and a clamping bar for releasably and adjustably securing the resilient support member to another cross bar of the existing luggage carrier. The tubular housing member and the resilient support member may be mounted to the existing luggage carrier without the need for hand or power tools. Multiple fishing rod holder assemblies may be releasably and adjustably mounted to an existing luggage carrier to suit the needs of the user.

20 Claims, 4 Drawing Sheets

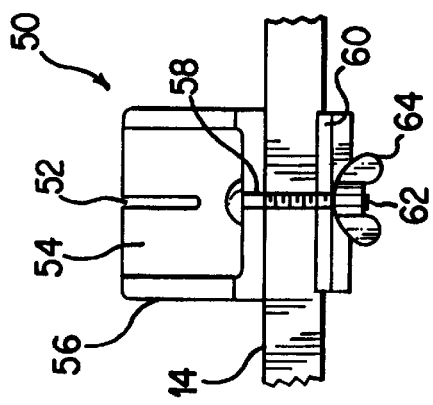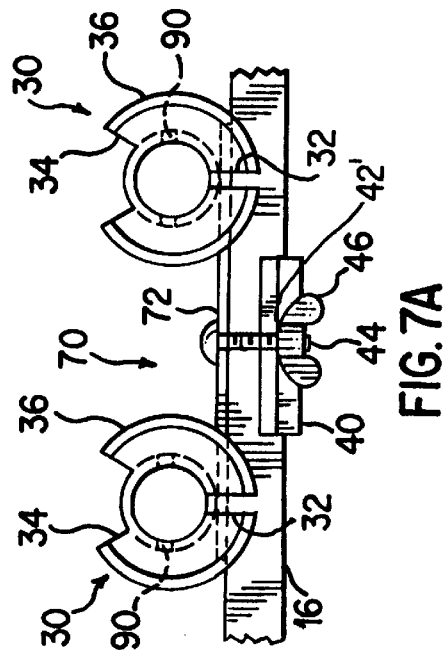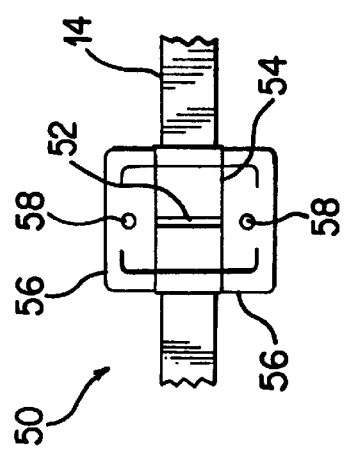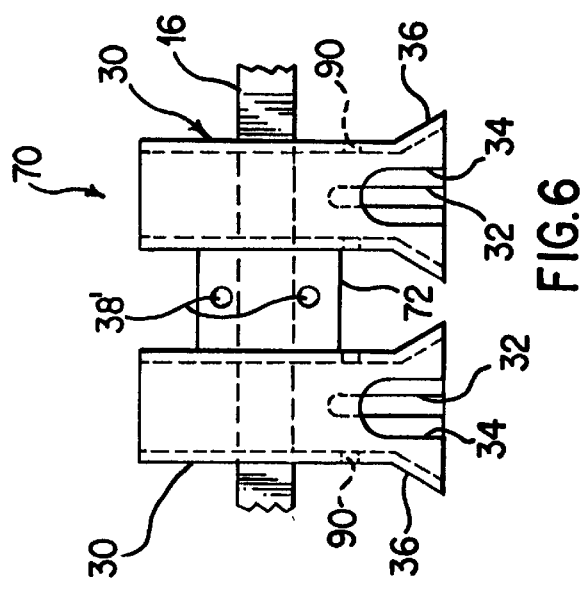

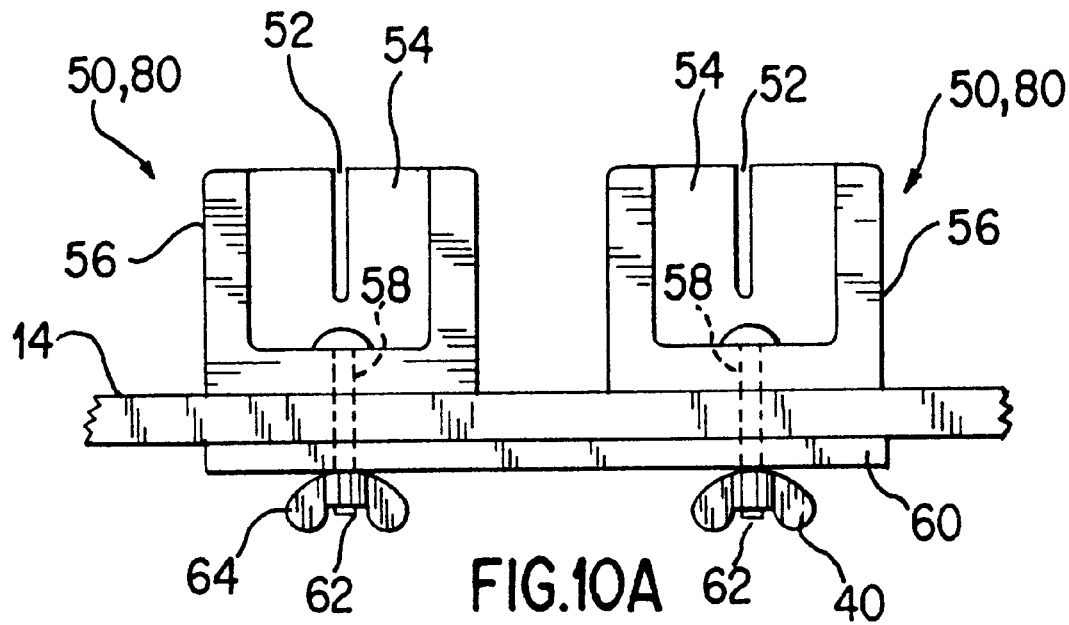
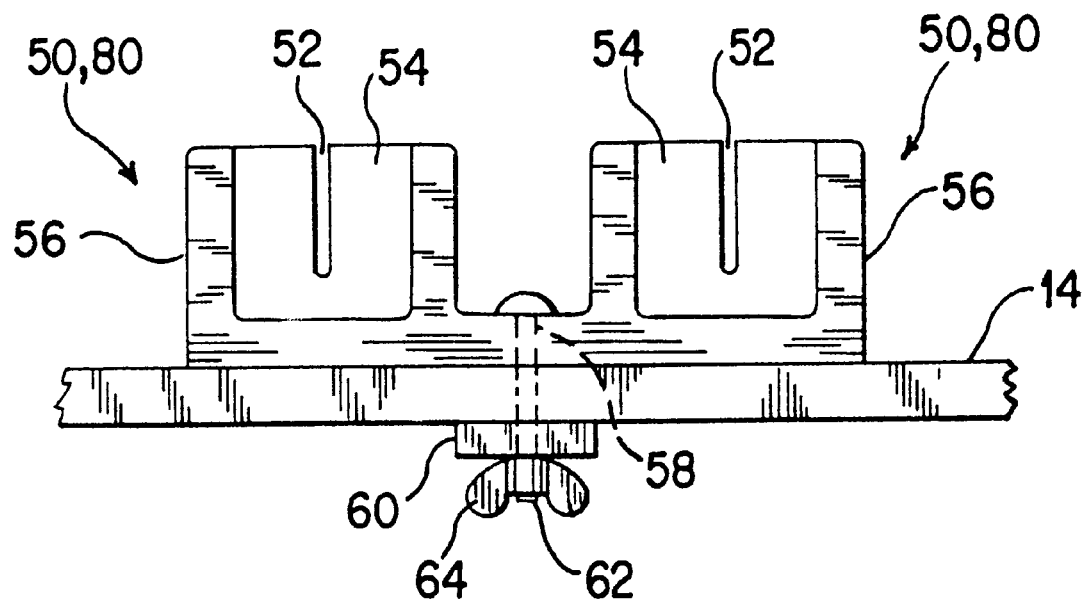

FISHING ROD HOLDER FOR CARTOP CARRIERS

BACKGROUND OF THE INVENTION

Most fishing sportsmen must transport their fishing rods to distant fishing areas, such as rivers, streams or ocean, to pursue their sport. Typically this involves transporting the fishing rod and reel by vehicle. Many fishermen have more than one fishing rod and reel, which are difficult to transport, and a family or group of fisherman may need to transport a plurality of fishing rods to the fishing site.

Some fishing rods are collapsible, but the time and effort required to disassemble and reassemble the fishing rod takes valuable time away from fishing. It is difficult to transport fishing rods of six feet or more in length within most vehicles.

Therefore what is needed, is a fast, convenient way to transport fishing rod and reels by vehicle, such as a car, truck, or other vehicle. Many vehicles are equipped with luggage carriers which are mounted upon the roof of the vehicle. The present invention is directed to a fishing rod carrier which is easily mounted to a vehicle's existing luggage carrier. One or more of these fishing rod holders may be mounted to the luggage carrier in order to carry as many fishing rods as needed during transport to and from the fishing site.

U.S. Pat. No. 4,871,099 issuing to Earl M. Bogar, Jr. on Oct. 3, 1989 discloses a plurality of fishing rod holders having a plurality of vertically extending tubular rods supported by a plurality of horizontally spaced supports, to support fishing rods on a boat.

U.S. Design Pat. No. 349,751, issuing to Dennis J. Ruff on Aug. 16, 1994 discloses a fishing pole holder having a resilient slot for receiving a rod tip portion within the slot.

SUMMARY OF THE INVENTION

The present invention is directed to a fishing rod holder adapted for mounting to an existing luggage carrier mounted to the top of a vehicle. The reel end of the fishing rod is inserted into a tubular housing which is releasably secured to the rear cross bar on the existing luggage carrier. The tip end portion of the fishing rod is then inserted into a vertical slot disposed within a resilient support which is releasably secured to the front cross bar on the existing luggage carrier.

The user may mount as many fishing rod holders as needed, side by side in spaced relation on the luggage carrier, with the fishing rods extending between the front and rear of the vehicle. The side-by-side spacing between fishing rod holders may be varied to suit the number of fishing rods to be transported, and the fishing rod holders may be offset from the vehicle centerline to enable other equipment to also be stored upon the luggage carrier.

A first clamping bar extends beneath the rear cross bar on the luggage carrier, and the tubular housing is positioned above the cross bar in alignment with the clamping bar. One or more fastening means extends between the tubular housing and the clamping bar to releasably secure the tubular housing to the rear cross bar of the luggage carrier.

Likewise, a second clamping bar extends beneath the front cross bar on the luggage carrier, and a resilient support member is positioned above the front cross bar in alignment with the clamping bar. One or more fastening means extends between the resilient support member and the clamping bar to releasably secure the resilient support member to the front cross bar of the luggage carrier.

BRIEF DESCRIPTION OF THE DRAWINGS

The above mentioned and other features and objects of this invention and the manner of attaining them will become more apparent and the invention itself will be best understood by reference to the following description of the invention, when considered in conjunction with the accompanying drawings, wherein:

FIG. 4 is a top view of the resilient support member.

FIG. 5 is an end view of the resilient support member mounted to a cross bar on an existing cartop luggage carrier.

FIG. 6 is a top view of two side-by-side tubular housing members mounted to a cross bar on an existing cartop luggage carrier.

FIG. 7A is an end view of two side by side resilient support members mounted to a cross bar on an existing cartop luggage carrier with a single fastening means.

FIG. 10A is an end view of a side-by-side resilient support member secured to a clamping bar with two fastening means.

FIG. 10B is an end view of a side-by-side resilient support member secured to a clamping bar by a single fastening means.

DESCRIPTION OF THE PREFERRED EMBODIMENTS OF THE INVENTION

Figure 1:
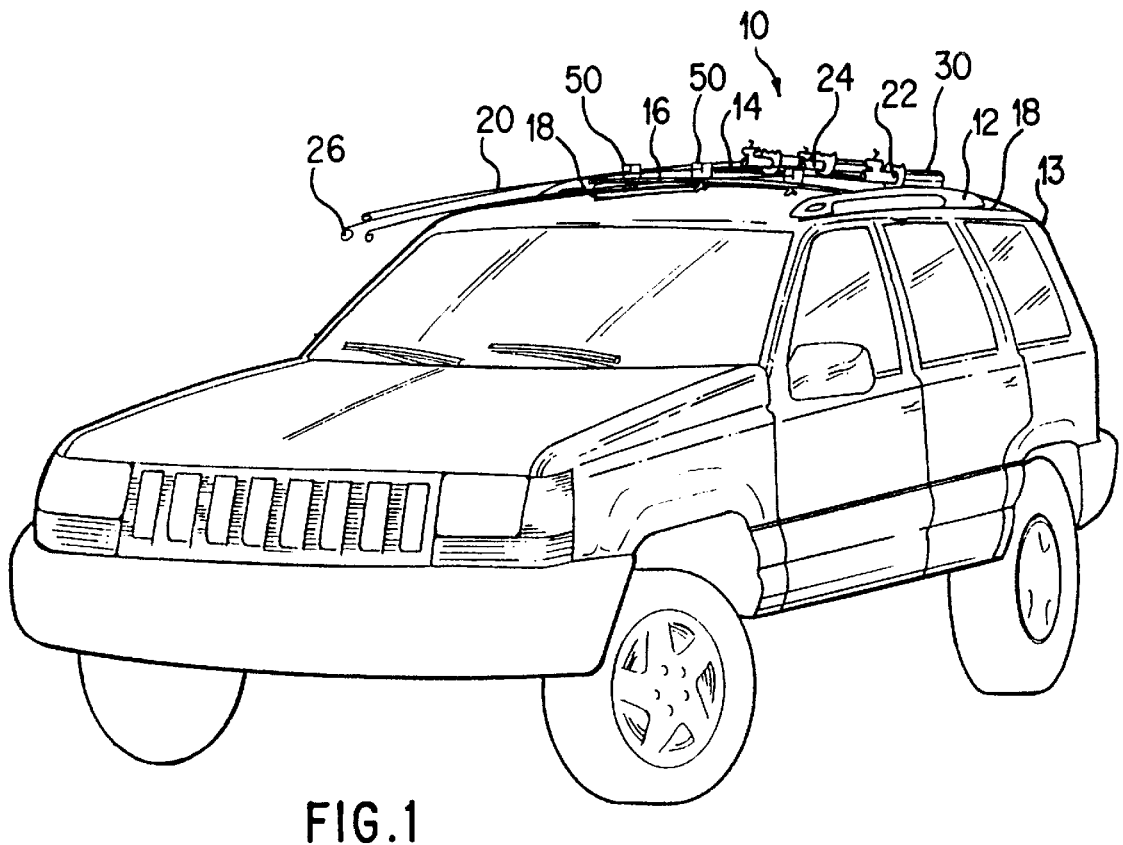
FIG. 1 is a perspective view of the fishing rod holder mounted upon an existing cartop carrier secured to a vehicle.

As shown in perspective in FIG. 1, the fishing rod holder assembly 10 is releasably secured to an existing luggage carrier 12 mounted to a vehicle 13. The luggage carrier 12 typically has a rear cross bar 14 and a front cross bar 16 extending between opposing rails. The distance between front and rear cross bars 14, 16, varies according to the type and manufacturing preference of the luggage carrier 12 manufacturer. Some luggage carriers 12 have more than two cross bars 14, 16, however for purposes of this invention, only two cross bars 14, 16 are utilized, and their spacing is not critical to the adaptation of this invention. This invention is adapted for use upon either permanent and removable luggage carriers.

As shown in FIG. 1, four fishing rods 20 may be carried upon the luggage carrier 12 with the adaptation of this invention. As will be obvious to one of average skill in this art, the fishing rod holder assembly 10 disclosed herein may be adapted to carry a single fishing rod 20, or a plurality of fishing rods 20, depending upon the number of fishing rod holder assemblies 10 mounted in side-by side relation upon the cross bars 14, 16 of an existing luggage carrier 12. Thus, the user is not limited to the number of fishing rods that may readily be carried, and may vary the number of removable fishing rod holders used from trip to trip to suit the needs of the user. Further, this invention may be used upon a vehicle 13 having an existing luggage carrier 12 permanently mounted to the roof of a vehicle 13.

As shown in FIG. 1, a fishing reel 22 is typically mounted on the reel end 24 of the fishing rod 20. The tip end 26 of the fishing rod 22 often extends six to twelve feet or more from the reel end 24. This makes transport difficult without the aid of a top mounted fishing rod holder assembly 10.

Figure 2:
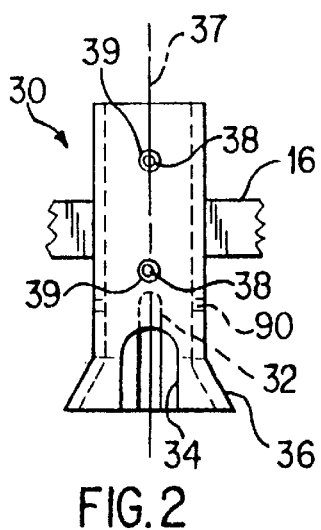
FIG. 2 is a top view of a single tubular housing member.

The reel end 24 of a fishing rod 20 is inserted along axis 37 into the reel slot 32 of a tubular housing member 30. The reel slot 32 is sized to receive a portion of the fishing reel 22 therein, and may include a flared end 36 to more easily align and receive a portion of the fishing reel 22 within the reel slot 32. A handle slot 34 is positioned on the opposite side of the tubular housing member 30 in alignment with the reel slot 32. See FIG. 2.

Preferably, at least one mounting aperture 38 extends through at least one wall of the tubular housing member 30. An enlarged clearance hole 39 is positioned through the upper portion of the wall of the tubular housing member 30, in alignment with the reel slot 32; and a mounting aperture 38 extends through the lower portion of the wall of the tubular housing member 30 in vertical alignment with the enlarged clearance hole 39. The mounting aperture 38 is sized to closely receive the fastener means 44 therethrough.

The tubular housing member 30 may be of any desirable cross sectional configuration, such as round, square, multi-sided, etc. and may be fabricated of known materials, such as metal, plastic, fiberglass, etc. Preferably, the tubular housing member 30 is made of a short length of PVC (poly-vinyl-chloride) tubing. The length of PVC tubing is preferably from three to twelve inches long.

Figure 3:
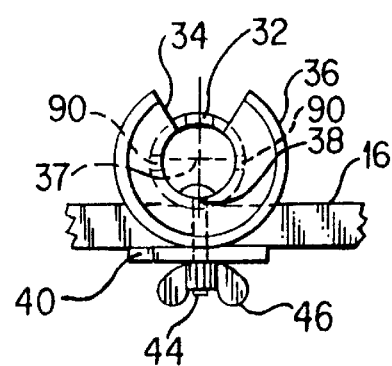
FIG. 3 is an end view of the tubular housing member mounted to a cross bar on an existing cartop luggage carrier.

As best shown in FIG. 3, the tubular housing member 30 is releasably secured to a rear cross bar 14 with the aid of a tubular housing member clamping bar 40. A fastening means 44 may be any known fastening means, such as a screw or bolt which extends between the tubular housing member 30 and the tubular housing clamping bar 40. The fastening means 44 is preferably secured with a wing nut 46 positioned beneath the tubular housing clamping bar 40, to enable the user to mount the fishing rod holder assembly 10 to an existing luggage carrier without the need for hand or power tools.

In this way, one or more fishing rod holder apparatus 10 may be selectively mounted at any desired location on the cross bars 14, 16, without requiring the drilling of any holes in the cross bars 14, 16, which weaken the cross bars and may result in permanent damage to the luggage carrier 12, and to the contents being transported thereon.

The variable, releasable positioning of the fishing rod holder assembly upon an existing luggage carrier is an important feature of this invention, and enables the user to vary the number of fishing rods 20 carried upon the luggage carrier 12 from trip to trip, to suit the varying needs of the user.

Further, the luggage carrier 12 is not damaged by drilling holes through the cross bars 14, 16, or by requiring removal of an existing vehicle luggage carrier 12, which may be mounted directly to the vehicle 13 roof.

The fishing rod holder assembly 10 disclosed herein, may alternately be mounted with the tip end 26 of the fishing rod 20 facing towards the front of the vehicle 13 (as shown in FIG. 1) or to the rear of the vehicle 13 (not shown), to suit user preference. Thus, while the terms front and rear cross bars are used herein, the user may elect to reverse the mounting configuration, and such use is intended to fall within the scope of this disclosure, and the following claims.

As best shown in FIG. 4 and 5, one or more resilient support member(s) 50 may be adjustably, releasably secured to the front cross bar 16. A resilient slot 52 in the resilient support member 50 is preferably vertically positioned in alignment with the axis 37 of a selected one of the tubular housing member(s) 30. The resilient material 54 is preferably a resilient foam material, which is supported within a mounting bracket 56 having at least one mounting aperture 58 therethrough. At least one suitable fastening means 62, extends between the mounting bracket 56 of the resilient support member 50 positioned above the front cross bar 16, and a resilient support clamping bar 60 which is positioned beneath the front cross bar 16. The fastening means 62 preferably includes at least one wing nut 64 positioned beneath the resilient support clamping bar 60, eliminating the need for hand or power tools during assembly or disassembly from respective cross bars 14, 16.

Figure 7B:
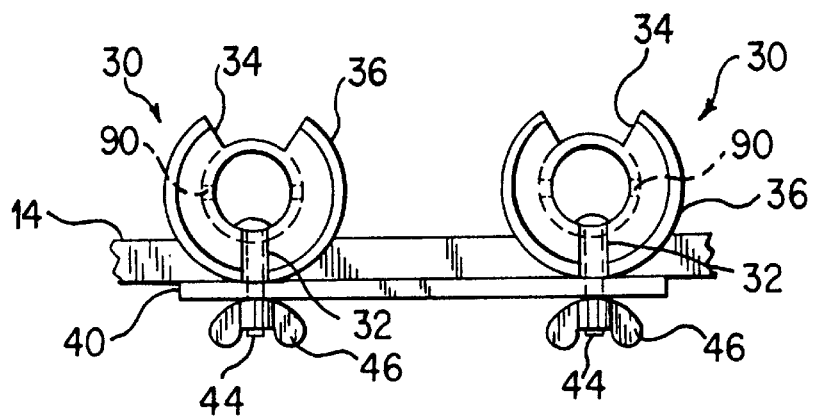
FIG. 7B is an end view of two side by side resilient support members mounted to a cross bar on an existing cartop luggage carrier with two fastening means.

It should be readily apparent to one of average skill in this art, that this invention may be releasably secured to the cross bars 14, 16 of an existing luggage carrier 12, at any convenient location along the cross bars 14, 16. This assures maximum user flexibility regarding the positioning of one or more fishing rod holder assemblies 10 disclosed herein.

Where multiple fishing rod holder assemblies 10 are desired, this invention is readily adapted for mounting one or more side-by-side tubular housing members 70, as best shown in FIG. 6, FIG. 7A and FIG. 7B. Where side-by-side tubular housing members 70 are utilized, preferably, a single clamping bar 40 may be used to secure the side-by-side tubular housing members 70. See FIG. 7A.

Figure 8:
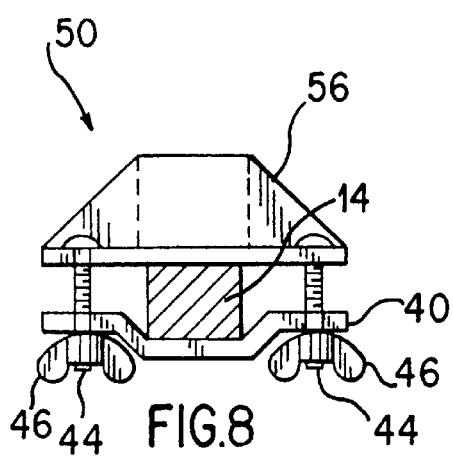
FIG. 8 is a side view of a clamping bar secured with two fastening means.
Figure 9:
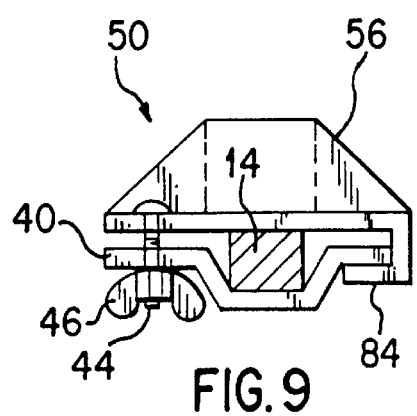
FIG. 9 is a side view of a clamping bar secured to an existing cartop luggage carrier by a single fastening means.

The side-by-side configurations shown in FIG. 6 and FIG. 7A have the advantage of sharing the fastening means, thus reducing the time and effort required to assemble the fishing rod holder assemblies 10 upon an existing luggage carrier 12. The side-by-side tubular housing members 70 preferably include all of the features previously disclosed relating to the tubular housing members 30 other than the quantity of mounting means, and thus will not be further discussed herein. The clamping bracket 56 shown in FIG. 8, may be modified with an end support 84, as shown in FIG. 9.

Likewise, the side-by-side resilient support members 80 shown in FIG. 10 preferably include all of the features previously disclosed relating to the resilient support member 50 other than the quantity of mounting means, and thus will not be further discussed herein.

It will be apparent to one of average skill in this art that side-by-side tubular housing members 70 and side-by-side resilient support members 80 may share a common mounting plate 72 having mounting apertures 38', or a common clamping bar 40 having corresponding mounting apertures 42 ' to suit design and manufacturing preference, and such adaptations are intended to be incorporated within the scope of this disclosure, and the following claims.

In operation, one or more tubular housing member(s) 30 are positioned above the rear cross bar 14, with the tubular housing clamping bar 40 aligned with a tubular housing member 30 beneath the front cross bar 16 of the luggage carrier 12. The fastening means 44 extends through the mounting aperture 38 in the tubular housing member 30 and into the mounting aperture 42 in the clamping bar 40. The mounting apertures 38, 42 may threadably receive the fastening means 44. Alternately, the fastening means 44 may be secured with a wing nut 46, eliminating the need for hand tools, such as a screw driver or power drill.

Preferably, a fastening means 44 extends between the tubular housing member 30 and the tubular housing clamping bar 40 on each side of the first or second cross bar 14, 16 of the existing luggage carrier 12. As each of the fastening means 44 is tightened, the tubular housing member 30 and the clamping bar 40 are drawn together about the selected front and rear cross bars 14, 16 of the existing luggage carrier 12 to snugly retain the tubular housing member 30 thereon.

Likewise, each resilient support member 50 is secured about the selected cross bar 14, 16 of the luggage carrier 12, in axial alignment with its respective tubular housing member 30.

In this way, from one to twelve or more fishing rod holder assemblies 10 may be mounted upon an existing luggage carrier 12, depending upon the needs of the user, and the quantity of removable fishing rod holder assemblies 10 mounted upon the existing luggage carrier 12. The quantity of removable fishing rod holder assemblies 10 mounted to the existing luggage carrier 12 may be varied from day to day, or from trip to trip to suit the varying needs of the user.

A locking aperture 90 preferably extends through opposing walls of the tubular housing member 30. The locking aperture 90 is sized to receive a locking cable, lock or locking pin (not shown) therethrough. The locking aperture 90 is positioned to restrict removal of the fishing reel and rod 20, 22 from the tubular housing member 30, when the locking cable, lock or locking pin is secured in the locking aperture 90, in order to inhibit unauthorized removal therefrom during transport or storage. Any known locking means sized to pass through the locking aperture 90 on the tubular housing member 30 may be used to releasably secure the fishing rod 20 and fishing reel 22 from the fishing rod holder assembly 10.

Thus, while the improved fishing rod holder assembly 10 has been fully described and disclosed, numerous modifications will become apparent to one of ordinary skill in this art, and such adaptations and modifications are intended to be included within the scope of the following claims.

I claim:

1. A fishing rod holder assembly for transporting a fishing rod, the fishing rod holder adapted for adjustable, releasable securement upon an existing luggage carrier having a front and rear cross bar, which comprises:

a) a tubular housing member sized to receive a portion of said fishing rod within a reel slot located at a reel end of a tubular housing, a handle slot disposed in alignment with the reel slot on an opposing side of the tubular housing, a tubular housing clamping bar and at least one tubular housing fastening means, for releasable and adjustable securement of the tubular housing member and the tubular housing clamping bar about a selected one of the front and rear cross bars of the existing luggage carrier; and b) a resilient support member having a mounting bracket supporting a vertically disposed resilient slot in axial alignment with said tubular housing member, said slot sized to receive another portion of the fishing rod, a resilient support clamping bar and resilient support fastening means, for securement of the resilient support mounting bracket and resilient support clamping bar about the other one of the front and rear cross bars of said existing luggage carrier.

2. The fishing rod holder assembly of claim 1, wherein the tubular housing fastening means comprises at least one bolt and at least one wing nut, and the resilient support fastening means comprises at least one bolt and at least one wing nut.

3. The fishing rod holder assembly of claim 1, wherein the tubular housing member comprises a short length of PVC tubing from three to twelve inches in length, having a circular cross section.

4. The fishing rod holder assembly of claim 1, wherein the tubular housing reel end is flared outwardly for ease of aligning a fishing reel mounted upon said fishing pole therein.

5. The fishing rod holder assembly of claim 1, wherein the vertically aligned slot in the resilient support member is sized to closely receive a tip end portion of said fishing rod.

6. The fishing rod holder assembly of claim 1, wherein the resilient support member comprises a resilient foam material having the vertically disposed slot therein, and the mounting bracket having at least one aperture sized to closely receive the fastening means therethrough, and wherein the resilient support clamping bar has a threaded aperture therein to threadably receive and secure the fastening means thereto.

7. The fishing rod holder assembly of claim 1, wherein said tubular housing member comprises two spaced, side-by-side tubular housing members securable to the selected one of the front and rear cross bars of said existing luggage carrier with said tubular housing clamping bar and said at least one tubular housing fastening means, said at least one tubular housing fastening means comprising a first fastening means positioned on one side of said selected one cross bar of said existing luggage carrier, and a second fastening means positioned on another side of said selected one cross bar of said existing luggage carrier.

8. The fishing rod holder assembly of claim 1, wherein said resilient support member comprises two spaced, sided-by-side resilient support members securable to the other of the front and rear cross bars of said existing luggage carrier with said resilient support clamping bar and said resilient support fastening means, said resilient support clamping bar and said resilient support comprising a first fastening means positioned on one side of said other cross bar of said existing luggage carrier, and a second fastening means positioned on another side of said other cross bar of said existing luggage carrier.

9. The fishing rod holder assembly of claim 1, wherein a locking aperture is provided through the tubular housing between the reel slot and the handle slot in proximity to the reel end of the tubular housing, to receive a locking means therethrough for restricting removal of the fishing rod from the tubular housing.

10. A fishing rod holder assembly for transporting two fishing rods, the fishing rod holder adapted for releasable, adjustable securement upon an existing luggage carrier having a front cross bar and a rear cross bar, which comprises:

a) two side-by-side spaced tubular housing members disposed in parallel axial alignment, the side-by-side spaced tubular housing members each sized to receive a portion of a fishing rod reel end therein, a reel slot located at one end of each said tubular housing member, a handle slot disposed in alignment with the reel slot on an opposing side of each said tubular housing member, a tubular housing clamping bar and at least one tubular housing fastening means, for releasable and adjustable securement of the tubular housing members and the tubular housing clamping bar about said a selected one of the front and rear cross bars of said existing luggage carrier; and b) two side-by-side spaced resilient support members, each having a mounting bracket supporting a vertically aligned resilient slot in axial alignment with a respective one of said side-by-side tubular housing members, each of said slots sized to receive another portion of a respective one of the fishing rods, a resilient support clamping bar and at least one fastening means, for releasable and adjustable securement of said two side-by-side resilient support members and said resilient support clamping bar about the other one of the front and rear cross bars of said existing luggage carrier.

11. The fishing rod holder assembly of claim 10, wherein the fastening means for said side-by-side tubular housing members comprises at least one bolt and at least one wing nut, and the fastening means for said side-by-side resilient support members comprises at least one bolt and at least one wing nut.

12. The fishing rod holder assembly of claim 10, wherein the side-by-side tubular housing members each comprises a short length of PVC tubing from three to twelve inches in length, having a circular cross section.

13. The fishing rod holder assembly of claim 10, wherein each said one end including said reel slot of said tubular housing members is flared outwardly for ease of aligning a fishing reel mounted upon the fishing rods therein.

14. The fishing rod holder assembly of claim 10, wherein the vertically aligned slots in the resilient support members are sized to closely receive a tip end portion of a respective one of the fishing rods.

15. The fishing rod holder assembly of claim 10, wherein each of the side-by-side resilient support members comprise a resilient foam support secured to the mounting bracket which forms said vertically aligned resilient slots, said mounting bracket having at least one aperture sized to closely receive the fastening means for the resilient support members therethrough, and wherein the resilient support clamping bar has a threaded aperture therein to threadably receive and releasably secure the fastening means for the resilient support members thereto.

16. The fishing rod holder assembly of claim 10, wherein the side-by-side tubular housing members are releasably and adjustably secured to the selected one of the front and rear cross bars of said existing luggage carrier with said tubular housing clamping bar and said at least one tubular housing fastening means, said at least one tubular housing fastening means comprising a first fastening means positioned on one side of the selected one of the front and rear cross bars and a second fastening means positioned on another side of the selected one of the front and rear cross bars of said existing luggage carrier.

17. The fishing rod holder assembly of claim 10, wherein a locking aperture is provided through each of the tubular housing members between the one slot and the handle slot in proximity to the reel end of the tubular housing members, to receive a locking means therethrough for restricting removal of the fishing rods from the tubular housing members.

18. A fishing rod holder assembly for transporting a fishing rod upon an existing luggage carrier having at least two cross bars, which comprises:

a) a tubular housing member sized to receive a portion of said fishing rod within a reel slot located at a reel end of a tubular housing, a handle slot disposed in alignment with the reel slot on an opposing side of the tubular housing reel end, a locking aperture extending through the tubular housing between the reel slot and the handle slot in proximity to the reel end, the locking aperture sized to receive a locking means therethrough for restricting removal of the fishing rod from the tubular housing, the tubular housing having an outwardly flared reel end, a tubular housing clamping bar and at least one fastening means, for releasable and adjustable securement of the tubular housing member and the tubular housing clamping bar about a selected one of the cross bars of said existing luggage carrier; and b) a resilient support member having a mounting bracket supporting a vertically disposed resilient slot in axial alignment with the tubular housing, the resilient slot sized to closely receive a portion of the fishing rod therein, a resilient support clamping bar and at least one fastening means, for releasable and adjustable securement of the resilient support member about another cross bar of said existing luggage carrier.

19. The fishing rod holder assembly of claim 18, wherein the tubular housing fastening means comprises at least one bolt and at least one wing nut, and the resilient support fastening means comprises at least one bolt and at least one wing nut.

20. The fishing rod holder assembly of claim 18, wherein the tubular housing member comprises a length of PVC tubing from three to twelve inches in length, having a circular cross section.

* * * * *